April 10, 1973
G. A. PROVOST  
3,726,752
ADHESIVE POLYAMIDE LAMINATE WITH A COATING COMPRISING
RESORCINOL, PHENOL AND TRIISOCYANATE
Filed Sept. 14, 1970
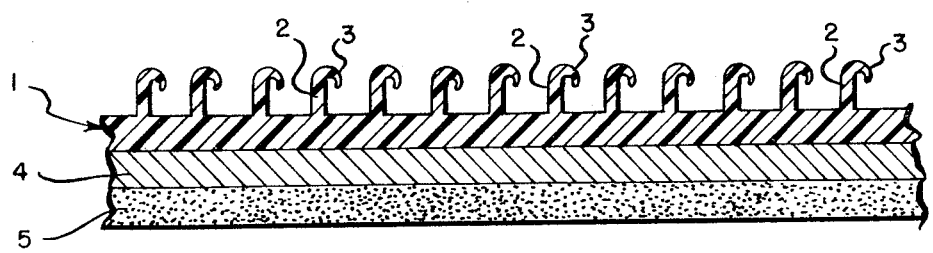
INVENTOR
George Provost
BY
ATTORNEYS

United States Patent Office 3,726,752
Patented Apr. 10, 1973

3,726,752
ADHESIVE POLYAMIDE LAMINATE WITH A COATING COMPRISING RESORCINOL, PHENOL AND TRIISOCYANATE
George A. Provost, Manchester, N.H., assignor to American Velcro, Inc., Manchester, N.H.
Filed Sept. 14, 1970, Ser. No. 71,920
Int. Cl. B32b 27/06, 27/34
U.S. Cl. 161—67       12 Claims

ABSTRACT OF THE DISCLOSURE

An adhesive laminate of a polyamide polymer is prepared by coating a web of polyamide polymer with a primer coating comprising resorcinol, phenol, triisocyanate and a diluent or vehicle and subsequently applying a lamina of a synthetic resin adhesive to the primer-coated web.

BACKGROUND OF THE INVENTION

This invention relates to adhesive films, and more particularly to adhesive laminates wherein a synthetic resin-based adhesive is laminated to a web of a polyamide polymer. Specifically, it has been found that such resin-based adhesives can be laminated to a polyamide polymer web to form a laminate which can be bonded to a variety of surfaces.

In early attempts to prepare adhesive laminates of a polyamide polymer and a synthetic resin-based adhesive which would be adaptable to a variety of applications and which would adhere to a variety of substrates, it was found that strong bonding between the polyamide substrate and the adhesive lamina were difficult to achieve. The prior art is well-studded with attempts at overcoming this problem. Firstly, Loughborough discloses in U.S. Pat. No. 2,349,290, a method for bonding polyamide fibers (nylon) to rubber. In so doing, the nylon fibers are treated with a phenolic nylon solvent and an aqueous dispersion of a rubber material such as rubber latex. Following this treatment the nylon fibers are then vulcanized to a rubber surface. It is immediately apparent that the success of this bonding process is the ability of the treated nylon material to vulcanize with a rubber composition. Secondly, Atwell, in U.S. Pat. No. 3,060,070 employs an adhesive coating of neoprene latex and resole (resorcinol-formaldehyde reaction products) preceded by a treatment with polyisocyanate in order to bond nylon to chlorosulphonated polyethylene rubber. Thirdly, Tawney, in U.S. Pat. No. 3,111,448 describes a method for bonding nylon to butyl rubber. This patent teaches an adhesive for this purpose which comprises a dihydric phenol, a phenolic dialkanol material, and a dialkanol aryl ether. Fourthly, Salem, in U.S. Pat. No. 2,766,164 describes a method for bonding a rubbery polymer to a synthetic linear polymer such as nylon using as an adhesive compound a mixture of a vinyl pyridine copolymer together with isocyanate compounds.

These attempts at bonding polyamide laminates have, for the most part, been directed to bonding polyamide polymer to a specific surface, primarily natural or synthetic rubber, whereas the present invention is directed to applications of a more general nature in that the present adhesive polyamide laminate can be bonded to a multitude of surfaces such as metal, glass, plaster, wood, rubber, plastic and other structural and non-structural surfaces.

In view of the limitations of the prior art, it was desirous to develop an adhesive laminate of a polyamide which could be stored and applied at a later time to a variety of smooth surfaces. Consequently, an extensive research program was engaged in which was primarily aimed at two major objectives: (a) obtaining a strong bond between the adhesive and the polyamide substrate and (b) developing an adhesive lamina which would provide strong bonding between the substrate and the surface to which it is bonded, i.e. a wall, etc.

Based on this research, it was discovered that an intermediate application to a polyamide web of a primer coating which comprises resorcinol, phenol, and triisocyanate in a solvent vehicle yielded a bonding surface for a synthetic resin-based adhesive which far surpassed previous experiments. This discovery, which is the present invention, provides an adhesive lamina of polyamide and adhesive having an unusually strong bond between the polyamide and the adhesive. The new laminate can be effectively applied to a broad range of surfaces, and affords strong, secure bonding.

SUMMARY OF THE INVENTION

Broadly, this invention is directed to an adhesive laminate which comprises a web of a polyamide polymer, a primer coating on the web which comprises (a) resorcinol, (b) phenol, (c) triisocyanate compound, and (d) a solvent vehicle for the primer coating; and a lamina of a synthetic resin-based adhesive on the primer coating.

BRIEF DESCRIPTION OF THE DRAWING

The sole figure is a side elevation view of the preferred embodiment of the laminate of this invention.

DETAILED DESCRIPTION OF THE INVENTION

During the comprehensive laboratory investigation which resulted in the present invention, it was found that primer coatings employing resorcinol alone, or phenol alone as the polyamide solvent resulted in slightly improved adhesive laminates which, however, were still less than satisfactory because of insufficient bond strength between the polyamide and the adhesive. It was subsequently discovered that this problem could be eliminated by using substantially equal amounts of both resorcinol and phenol in the primer coating. It was this unexpected synergistic effect which resulted in the present invention.

Polyamides or nylons in general, are suitable for the polyamide component of the present invention. These resins are well known in the art and include the condensation products of, for example, adipic acid and hexamethylenediamine, of beta-methyladipic acid and hexamethylenediamine, and polymerization products of caprolactam. Typical of these compounds are "Zytel 101," and "Zytel 211" sold by E. I. du Pont de Nemours and Company and "No. 8205" sold by Allied Chemical Corporation.

The polyamide web used in the present invention may be smooth on both sides or may be smooth on one side and molded on the other. U.S. patent application 824,597, filed May 14, 1969 (now abandoned in favor of continuation application Ser. No. 203,878 filed Dec. 1, 1971) which has the same assignee as the present invention describes a web of polyamide polymer which is a molded product having disposed on one side a plurality of pile-like protuberances, each of which protuberances is in the form of a post surmounted by a hooking portion. Reference number 1 in the drawing represents a molded web of this type while reference numerals 2 and 3 designate the post and hooking portion of each protuberance respectively. The side opposite the pile-like protuberances is substantially smooth. It is therefore contemplated as being a preferred embodiment of the present invention that the aforementioned molded polyamide web be coated with a primer coating 4 on the side opposite the pile-like protuberances, the primer coating comprising resorcinol, phenol, triisocyanate, and a solvent vehicle for the primer coating, and subsequently applying to the primer coating a lamina 5 of a synthetic resin-based adhesive.

It has been found that the primer coating should contain an amount of resorcinol in the range of from about 10 to about 20 percent by weight of the primer coating and an amount of phenol also in the range of from about 10 to about 20 percent by weight of the primer coating. While the amounts of resorcinol and phenol may vary within the ranges stated it is preferred that the particular concentration of these reagents not differ by more than about 5 percent, the primer coating being most effective when both the resorcinol and the phenol are present at a concentration of about 15 percent by weight of the primer coating.

The triisocyanate compound contained in the primer coating is typified by triphenylmethane triisocyanate. Many other organic triisocyanate compounds may be employed and are commercially available, for example, Mobay's triphenylmethane triisocyanate sold as Mondur RM and USM Corporation's Boscodur No. 5 which is a volatile organic solvent solution containing about 50 percent by weight of an organic triisocyanate.

The primer coating embodied in this invention is prepared by mixing the resorcinol, phenol and triisocyanate in an inert solvent or vehicle. Any solvent can be used provided that it is an effective solvent for, and that it be relatively inert to, the other primer coating components. Illustrative of some of the vehicles which can be employed are acetone, methylethyl ketone, diethyl ketone, benzene, and xylene.

Many types of adhesives are suitable for use as the adhesive lamina of this invention. Suitable adhesives for this purpose include pressure sensitive, heat activated and solvent activated adhesives as well as contact-type cements. Those pressure sensitive adhesives which are especially applicable are: BB 7521C (a solution of mixed acrylic resins) sold by USM Corporation and 5515 sold by Angiers, both of which are elastomeric type adhesives. Some of the solvent activated adhesives which are particularly adaptable are BB 4025 (a solvent based nitrile adhesive containing about 23 to 27% solids; color—tan; viscosity—8 to 10 secs., at 25° C., F.S.B.; wt.—7.2 lbs./gal., T.O.C. flash point—34° F.), BB 4044 (a solvent based synthetic rubber resin adhesive containing about 27% by weight solids; color—red; viscosity—12 to 16 secs., F.S.B. ⅜", at 25° C.; wt.—7½ lbs./gal.; T.O.C. flash point—7° F. on solvent), BB 1036 (a neoprene base-solvent adhesive containing approximately 31.5% solids; color—tan; viscosity—8,000 cps.; wt.—7.9 lbs./gal.; T.O.C. flash point—35° F.), BB 1082 (a solvent based neoprene adhesive containing approximately 29 to 31% solids; color—buff, viscosity—15 to 19 secs.; ⅜" F.S.B. at 25° C.; wt.—8.05 lbs./gal.; T.O.C. flash point—approximately 55° F.), and 7390 (a solvent based synthetic resin adhesive containing approximately 20% by weight solids; color—straw; viscosity—3,000 to 4,000 cps.; wt. 8.42 lbs./gal.; T.O.C. flash point—65° F.) all of which are distributed by USM Corporation. One of the most versatile adhesives which can be used is BB 4045 (a nitrile rubber based adhesive containing approximately 27% by weight solids; color—clear; viscosity—approximately 2400 cps.; wt.—7.2 lbs./gal.; T.O.C. flash point—minus 10° F.) distributed by USM Corporation and which is both heat and solvent activated. All of the aforementioned adhesives are synthetic resin-based adhesives and have been found to form non-legging laminates which bond strongly to polyamide films when laminated in accordance with the present invention.

The adhesive polyamide laminate of this invention can also embody multiple adhesive laminae. It has been found especially desirable to laminate a layer of BB 4045 to the primer coating followed by a second lamination of one of the aforementioned heat or solvent activated adhesives. Subsequent laminations with other adhesives not mentioned herein are also envisioned and are completely within the scope of the present invention.

Another preferred embodiment of the present invention is a method for securing to a substantially smooth surface a web of a polyamide polymer such as the aforementioned molded polyamide web having disposed on one side a plurality of pile-like proturberances. The method comprises coating the web on the side to be secured to the surface with a primer coating which comprises: (a) resorcinol, wherein said resorcinol is present in an amount of from about 10 to 20 percent by weight of the primer coating; (b) phenol, wherein said phenol is present in an amount of from about 10 to 20 percent by said weight of the primer coating; (c) triisocyanate, wherein said triisocyanate is present in an amount of from about 1 to 5 percent by weight of said primer coating; and (d) a vehicle for said primer coating wherein said vehicle is present in an amount of from about 50 to 70 percent by weight of the primer coating; and causing said vehicle to evaporate, thereby obtaining a dried primer coating on said web. The dried primer coating is then cured in the presence of infrared radiation. The curing may take place at temperatures in the range of from about 275° F. to about 325° F. for a period of time sufficient to cause the uncured primer coating to cure. In the presently preferred embodiment of this invention the curing temperature is about 300° F. and the exposure time is about 1 minute. After a proper cure has been effected, a lamina of synthetic resin based adhesive of the type mentioned above is applied to the cured primer coating and dried.

The following examples are the results of data accumulated during the research efforts which culminated in the present invention. They are illustrative of the early attempts to prepare an adhesive polyamide web and also of the synergistic effect of combining substantially equivalent amounts of resorcinol and phenol in the primer coating. They are indended merely to clarify and further point out the subject matter of the present invention and in no way to limit the scope thereof.

PRIMER COATING WITHOUT PHENOL

Example I

A film of Du Pont Zytel 101 was coated with a primer coating containing 30 grams of resorcinol, 5 grams of Boscodur No. 5, and 65 grams of methylethyl ketone. The coated film was first dried by allowing the methylethyl ketone to evaporate and then the laminate of film and primer coating was cured in an infrared oven at a temperature of about 300° F. for one minute. Thereafter the cured laminate was further laminated with BB 4045 adhesive composition produced by the USM Corporation. The adhesive laminate obtained in this manner was then applied to a smooth surface and allowed to set. The Zytel film was easily separable from the smooth surface, most of the adhesive remaining attached to the smooth surface.

PRIMER COATING WITHOUT RESORCINOL

Example II

A film of Du Pont Zytel 101 was coated with a mixture of 30 grams of phenol, 5 grams of Bosodur No. 5, and 65 grams of methylethyl ketone. When the coating had dried the film was cured in an infrared oven at a temperature of 300° F. for one minute. Upon removal from the oven the cured film was laminated with BB 4045 produced by the USM Corporation. With this laminate, it was found that the film was not strongly bonded to the adhesive.

EQUAL PORTIONS OF RESORCINOL AND PHENOL

Example III

A film of Du Pont Zytel 101 was coated with a primer coating containing 15 grams of resorcinol, 15 grams of phenol, 5 grams of Boscodur No. 5, and 65 grams of methylethyl ketone. The primer coating was allowed to dry after which curing was effected in an infrared oven at a temperature of about 300° F. for one minute. A lamina of BB 4045 was then applied to the cured laminate. The adhesive laminate thus obtained exhibited unusually strong bonding when applied to a smooth surface.

Example IV

A molded product of Du Pont Zytel 101 having disposed on one side a plurality of pile-like protuberances each of which was in the form of a post surmounted by a hooking portion was coated on the side opposite the protuberances with a primer coating containing 15 grams of resorcinol, 15 grams of phenol, 5 grams of Boscodur No. 5 and 65 grams of acetone. After the primer coating had dried, the molded laminate was cured by placing it in an infrared oven at a temperature of about 300° F. for one minute. Then, a layer of BB 4045 produced by the USM Corporation was applied to the primer coating. The resulting adhesive laminate showed excellent bonding properties when applied to a smooth surface.

Example V

An adhesive laminate was prepared as in Example IV by coating the side opposite the protuberances with a primer coating containing 19 grams of resorcinol, 14 grams of phenol, 3 grams of Boscodur No. 5, and 64 grams of methylethyl ketone. When the primer coating had dried, a lamina of Angiers' 515 adhesive was applied to the primer coating to thereby obtain the final laminate which demonstrated excellent bonding characteristics when applied to a smooth surface.

Example VI

A film of Du Pont Zytel 211 was coated with a primer coating containing 11 grams of resorcinol, 11 grams of phenol, 10 grams of Boscodur No. 5, and 68 grams of benzene. When the primer coating had dried, the laminate of film and primer coating was cured by placing it in an infrared oven at a temperature of about 300° F. for one minute. Thereafter, a lamina of USM 1036 adhesive material was applied to the primer coating to obtain the final laminate which showed excellent bonding characteristics when applied to a smooth surface.

I claim:

1. An adhesive laminate which comprises:
   (a) a web comprising a polyamide polymer;
   (b) a primer coating on said web which comprises:
      (i) resorcinol, wherein said resorcinol is present in an amount of from about 10 to 20 percent by weight of said primer coatings;
      (ii) phenol, wherein said phenol is present in an amount of from about 10 to 20 percent by weight of said primer coating;
      (iii) triisocyanate, wherein said triisocyanate is present in an amount of from about 1 to 5 percent of said primer coating; and
   (c) a lamina of synthetic resin-based adhesive on said primer coating.

2. The adhesive laminate of claim 1 in which said primer coating is on one side of said web.

3. The adhesive laminate of claim 2 in which said web comprises a molded product of a polyamide having disposed on the side opposite said primer coating a plurality of pile-like protuberances each of which is in the form of a post surmounted by a hooking portion.

4. An adhesive laminate which comprises:
   (a) a web of polyamide polymer, said web comprising a molded product of a polyamide having disposed on one side a plurality of pile-like protuberances each of which is in the form of a post surmounted by a hooking portion;
   (b) a primer coating on the side of the web opposite said pile-like protuberances, said primer coating comprising:
      (i) resorcinol, wherein said resorcinol is present in an amount about 15 percent by weight of said primer coating,
      (ii) phenol, wherein said phenol is present in an amount about 15 percent by weight of said primer coating,
      (iii) triisocyanate, wherein said triisocyanate is present in an amount about 3.5 percent by weight of said primer coating; and
   (c) a lamina of synthetic resin-based adhesive on said primer coating.

5. A method for securing a web of a polyamide polymer to a substantially smoth surface which comprises:
   (a) coating said web on the side to be secured to said surface with a primer coating, said primer coating comprising:
      (i) resorcinol, wherein said resorcinol is present in an amount of from about 10 to 20 percent by weight of said primer coating,
      (ii) phenol, wherein said phenol is present in an amount of from about 10 to 20 percent by weight of said primer coating,
      (iii) triisocyanate, wherein said triisocyanate is present in an amount of from about 1 to 5 percent by weight of said primer coating,
      (iv) a substantially inert vehicle for said primer coating, wherein said vehicle is present in an amount of from about 50 to 70 percent by weight of said primer coating;
   (b) evaporating said vehicle;
   (c) curing said primer coating and web;
   (d) applying a lamina of synthetic resin-based adhesive to said cured primer coating to obtain an adhesive laminate; and
   (e) applying the side of said cured adhesive laminate having said adhesive lamina to said surface, thereby securing said web to said surface.

6. The method of claim 5 wherein the primer coating and web are cured at a temperature of about 275° F. to 325° F.

7. The method according to claim 6 wherein the primer coating and web are cured at said temperature for about one minute.

8. The method of claim 7 in which said web comprises a molded product of a polyamide having disposed on one side a plurality of pile-like protuberances each of which is in the form of a post surmounted by a hooking portion, and the other side of which is substantially smooth, and which other side is the side to be secured to said surface.

9. A method for preparing a polyamide adhesive laminate which comprises:
   (a) coating a web of a polyamide polymer with a primer coating, said primer coating comprising:
      (i) resorcinol, wherein said resorcinol is present in an amount of from about 10 to 20 percent by weight of said primer coating,
      (ii) phenol, wherein said phenol is present in an amount of from about 10 to 20 percent by weight of said primer coating,
      (iii) triisocyanate, wherein said triisocyanate is is present in an amount of from about 1 to 5 percent by weight of said primer coating,
      (iv) a substantially inert vehicle for said primer coating, wherein said vehicle is present in an amount of from about 50 to 70 percent by weight of said primer coating;
   (b) evaporating said vehicle;
   (c) curing said primer coating and web; and
   (d) applying a lamina of synthetic resin-based adhesive to said cured primer coating to obtain the adhesive laminate.

10. The method according to claim 9 wherein the primer coating and web are cured at a temperature of about 275° F. to 325° F.

11. The method according to claim 10 wherein the primer coating and web are cured at said temperature for about one minute.

12. The method of claim 11 in which said web comprises a molded product of a polyamide having disposed on one side a plurality of pile-like protuberances each of which is in the form of a post surmounted by a hooking portion, and the other side of which is substantially smooth, and which other side is the side to be secured to said surface.

References Cited

UNITED STATES PATENTS

| | | | |
|---|---|---|---|
| 2,916,403 | 12/1959 | Calderwood | 260—47 CB |
| 3,226,276 | 12/1965 | Rye et al. | 117—138.8 N |
| 3,251,713 | 5/1966 | Crone, Jr. | 260—47 CB |

FOREIGN PATENTS

| | | | |
|---|---|---|---|
| 141,275 | 5/1951 | Australia | 117—138.8 N |

DANIEL J. FRITSCH, Primary Examiner

U.S. Cl. X.R.

156—307, 308, 326, 331; 161—190, 227; 260—47 CB